US008588090B2

(12) United States Patent
Nammi et al.

(10) Patent No.: US 8,588,090 B2
(45) Date of Patent: Nov. 19, 2013

(54) METHOD AND APPARATUS FOR SCHEDULING USERS IN A FREQUENCY DIVISION DUPLEX WIRELESS SYSTEM WITH DUTY CYCLE LIMITATION

(75) Inventors: Sairamesh Nammi, Dallas, TX (US); Hossam H'mimy, Allen, TX (US); Nishant Batra, Addison, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 334 days.

(21) Appl. No.: 12/968,029

(22) Filed: Dec. 14, 2010

(65) Prior Publication Data

US 2012/0044842 A1 Feb. 23, 2012

Related U.S. Application Data

(60) Provisional application No. 61/374,404, filed on Aug. 17, 2010.

(51) Int. Cl.
*H04L 12/26* (2006.01)
*H04W 4/00* (2009.01)

(52) U.S. Cl.
USPC .......................................... 370/252; 370/329

(58) Field of Classification Search
None
See application file for complete search history.

(56) References Cited

U.S. PATENT DOCUMENTS

| 6,078,819 A * | 6/2000 | Ciccone et al. ............... 455/463 |
| 8,155,065 B2 * | 4/2012 | Gerstenberger et al. ...... 370/329 |
| 8,179,853 B2 * | 5/2012 | Hu et al. ....................... 370/329 |
| 8,301,951 B2 * | 10/2012 | Miki et al. .................... 714/748 |
| 8,306,557 B2 * | 11/2012 | Iwamura et al. .............. 455/458 |
| 2007/0293229 A1 * | 12/2007 | Khan ............................ 455/450 |
| 2009/0016252 A1 * | 1/2009 | Ho et al. ....................... 370/311 |
| 2009/0307554 A1 * | 12/2009 | Marinier et al. ............. 714/748 |

* cited by examiner

*Primary Examiner* — Steven H Nguyen

(57) ABSTRACT

A system and method to provide intelligent scheduling of network resources when a user equipment (UE) is operating in a Frequency Division Duplex (FDD) wireless network with duty cycle limitation. Intelligent scheduling is accomplished in two stages—a training stage, and a scheduling stage. In the training stage, a training module in the eNodeB senses the Transmission Time Interval (TTI) pattern when the UE is "awake" (i.e., when the UE is transmitting power under a P % duty cycle (P<100)). In the scheduling stage, a scheduler in the eNodeB intelligently allocates the network resources to the UE for transmission on both uplink and downlink based on the information from the training stage. Thus, resources are allocated only when the UE is "awake" or can send/receive ACK/NAK when it is awake. Such intelligent scheduling may substantially reduce re-transmissions in the system and may improve system's efficiency in duty cycle-limited frequency bands.

19 Claims, 3 Drawing Sheets

METHOD AND APPARATUS FOR SCHEDULING USERS IN A FREQUENCY DIVISION DUPLEX WIRELESS SYSTEM WITH DUTY CYCLE LIMITATION

CROSS-REFERENCE TO RELATED APPLICATIONS

This application claims the priority benefit under 35 U.S.C. §119(e) of U.S. Provisional Application No. 61/374,404 filed Aug. 17, 2010, the disclosure of which is incorporated herein by reference in its entirety.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to resource allocation in wireless communication systems. More particularly, and not by way of limitation, the present invention is directed to a system and method for scheduling users in a Frequency Division Duplex (FDD) wireless system with duty cycle limitation.

A wireless communication system (e.g., a cellular telephone network) may be an FDD wireless system in which uplink transmissions (e.g., transmissions from a mobile device to a base station in a cellular network) and downlink transmissions (e.g., transmissions from a base station to a mobile device in a cellular network) may use different frequency bands, but both the transmissions are possible simultaneously (i.e., in a duplex manner) in the assigned frequency bands (or telecommunication channels). Generally, both the uplink and downlink transmissions work with a 100% duty cycle—i.e., a mobile device (or user equipment (UE)) and a network node (e.g., a base station or an eNodeB (enhanced Node B or eNB)) transmit power all the time when active.

FIG. 1 identifies an exemplary radio frame 10 having a 100% duty cycle. FIG. 1 illustrates one radio frame 10 (Frame N) in a sequence of radio frames (Frames N−1, N, N+1, etc.) that may constitute the communication "link" between the network node (e.g., eNodeB 36 in FIG. 3, which is discussed later hereinbelow) and the mobile devices (e.g., the UE 32 in FIG. 3) in the wireless network (e.g., the carrier network 34 in FIG. 3). The radio frame 10 may be of a fixed duration and may be divided into a fixed number of equally-sized subframes identified as subframes "S0" through "S9" in FIG. 1. For example, in case of an LTE (Long-Term Evolution) network, each radio frame 10 (i.e., each of Frame N, Frame N+1, etc.) may be of 10 ms duration, and may contain 10 subframes of 1 ms each as shown in FIG. 1. The frequency bandwidth of the radio frame 10 may depend on the overall system bandwidth available in the carrier network. When a mobile device is active in an FDD carrier network, it operates at 100% duty cycle and it may transmit power in each subframe as shown in FIG. 1. In case of the LTE network, the subframe duration of 1 ms may be referred to as a Transmission Time Interval (TTI). Thus, in a 100% duty cycle operation, there may be ten TTI's in each frame 10 as shown in FIG. 1. The eNB may schedule a mobile device to use different TTI's to transmit different contents (e.g., TTI-1 to transmit requests for network resources; TTI-0 and TTI-5 to receive synchronization signals from eNB; TTI-3 to transmit channel-related information; TTI-5, TTI-6, and TTI-7 to transmit voice and text messaging content; etc.). The scheduling by eNB may involve providing necessary channel (frequency) resources to the mobile device to enable the mobile device to carry out communication with the eNB. In any event, in case of a 100% duty cycle operation, the mobile device continues to transmit power during all TTI's even when no voice/data or other content is transmitted/received during a particular TTI.

However, there are some instances where the mobile device (e.g., the UE 32 in FIG. 3) or the network node (e.g., the eNB 36 in FIG. 3) work with some duty cycles less than a 100% duty cycle. For example, the Wireless Communications Service (WCS) band in the frequency spectra of 2305-2320 MHz and 2345-2360 MHz is allotted by the Federal Communication Commission (FCC) to provide fixed, mobile, radiolocation or satellite communication services to individuals and businesses within their assigned spectrum block and geographical area. The frequency spectra of the WCS band are divided into four blocks (A, B, C, and D) of 5 MHz and 10 MHz sizes. The WCS is capable of providing advanced wireless phone services (e.g., services that are able to pinpoint subscribers in any given locale) and can also support an entire family of new communication devices utilizing very small, lightweight, multi-function portable phones and advanced devices with two-way data capabilities allowing subscribers to send and receive data, video messages and/or other multimedia/broadband content without connection to a wire. However, a mobile device operating in the WCS band may cause interference with adjacent bands (e.g., bands assigned to commercial satellite radio broadcasts). Hence, to reduce or limit interference with adjacent bands, the FCC has mandated that each mobile device operating in the WCS band may have a maximum duty cycle of 25% in blocks NB of the WCS band and 12.5% in blocks C/D of the WCS band.

FIG. 2 identifies two exemplary radio frames 14, 16 implementing a 25% duty cycle power transmission from a mobile device. It is seen from FIG. 2 that a mobile device operating in a wireless band (e.g., the WCS band discussed above) having a 25% duty cycle restriction may transmit power in only a selected number of TTI's in each frame—e.g., TTI-0, TTI-4, and TTI-8 in Frame N; and so on. In other words, in case of FIG. 2, the mobile device may transmit power in every fourth TTI after the initial TTI to maintain the required 25% duty cycle, and, hence, may not be able to transmit any content in the remaining TTI's in which no power is transmitted. As another example, in case of a 20% duty cycle (not shown), the mobile device may transmit power every fifth TTI after the initial TTI—i.e., only two TTI's per frame are used for content transmission/reception. Other duty cycles (less than 100%) may be similarly implemented.

SUMMARY

From the discussion above, it is observed here that when a mobile device is operating in an FDD wireless system with duty cycle limitation, intelligent scheduling is required on the part of the eNB (or other network node in direct communication with the mobile device) to allocate resources to the mobile device for uplink and downlink transmissions. In the absence of such intelligent scheduling, the system may require a lot of re-transmissions and may malfunction. For example, in case of the 25% duty cycle operation depicted in FIG. 2, if the eNB sends a downlink message to the mobile device in a TTI in which the mobile device does not transmit power or if the eNB schedules the mobile device to transmit in the TTI's that would prevent the mobile device from maintaining the 25% duty cycle restriction, the eNB may not receive timely ACK/NAK (Acknowledged/Not Acknowledged) responses from the mobile device. That, in turn, may require eNB to retransmit its requests with the hope that they will be received by the mobile device in the correct TTI's— i.e., when the mobile device is transmitting power. Similarly, the mobile device also may not receive ACK/NAK from the eNB (e.g., in response to an uplink data transmission by the mobile device) if the ACK/NAK is scheduled for a TTI in which the mobile device does not transmit power. That would also require the mobile device to retransmit the previous content until ACK/NAK is received from the network node. Such guesswork may result in a lot of system-wide re-transmissions, making the system inefficient in duty cycle-limited bands.

In case of a TDD (Time Division Duplex) wireless system, the TDD standards address this duty cycle limitation issue by allowing the mobile device and the network node to send ACK/NAK for multiple packets. This is done by ACK/NAK bundling or ACK/NAK multiplexing. However, no such standards-based solution is available for an FDD wireless system to address the scheduling problems associated with duty cycle limited frequency bands. Therefore, it is desirable to devise a system and method to provide intelligent scheduling of mobile devices in an FDD wireless system with duty cycle limitation. In view of limited radio resources available in a wireless network, it is further desirable that the intelligent scheduling be accomplished with network's existing radio resources and signaling framework, and without significant disruption to network architecture or functionality.

The present invention provides a solution to scheduling problems arising in FDD wireless systems having mobile devices (or user equipments (UE's)) operating in duty cycle limited frequency bands. In one embodiment of the present invention, intelligent scheduling is accomplished using a method that has two stages—a training stage, and a scheduling stage. In the initial training stage, a training module in the eNB senses the Transmission Time Interval (TTI) pattern when the UE is "awake" (i.e., when the UE is transmitting power under a P % duty cycle (P<100)). In the scheduling stage, a scheduler in the eNB intelligently allocates the channel resources to the UE for transmission on both uplink and downlink based on the information from the training stage. Thus, resources are allocated only when the UE is "awake" or can send/receive ACK/NAK when it is awake. Such intelligent scheduling may substantially reduce re-transmissions in the system and, hence, may improve system's efficiency in duty cycle-limited frequency bands.

In one embodiment, the present invention is directed to a method of scheduling communication for a mobile handset operating in a wireless frequency band with a duty cycle limitation. The method comprises the step of determining a duty cycle-related TTI pattern (T_D) of the mobile handset using a network-based processor in wireless communication with the mobile handset via a wireless network associated with the mobile handset. The T_D is determined when the mobile handset is operating in the wireless frequency band with a partial duty cycle that is less than a 100% duty cycle. Using the network-based processor, the method also comprises the step of scheduling the mobile handset in the wireless network only during a T_D-based TTI so as to enable the network-based processor to establish a substantially retransmission-less communication with the mobile handset in the wireless frequency band despite the duty cycle limitation.

In another embodiment, the present invention is directed to a mobile communication node configured to provide radio interface to a mobile handset in a wireless network associated with the mobile handset. The mobile communication node comprises: means for determining a duty cycle-related TTI pattern (T_D) of the mobile handset when the mobile handset is operating under a duty-cycle limited wireless frequency band in the wireless network with a partial duty cycle that is less than a 100% duty cycle; and means for scheduling the mobile handset for transmission in the wireless network only during a T_D-based TTI.

In another embodiment, the present invention is directed to a method, which comprises establishing wireless communication with a mobile handset using a network-based processor that is in wireless communication with the mobile handset via a wireless network associated with the mobile handset; and, using the network-based processor, scheduling the mobile handset to transmit to the network-based processor in the wireless network only during a partial duty cycle of the mobile handset, wherein the mobile handset operates only at the partial duty cycle when communicating under a duty cycle-limited wireless frequency band in the wireless network and wherein the partial duty cycle is less than a 100% duty cycle.

In another embodiment, the invention is directed to a system, which comprises a mobile handset operable in a wireless network associated therewith; and a mobile communication node configured to provide radio interface to the mobile handset in the wireless network. In the system, the mobile communication node is further configured to determine a duty cycle-related TTI pattern (T_D) of the mobile handset when the mobile handset is powered on and operating in the wireless network under a duty-cycle limited wireless frequency band with a partial duty cycle that is less than a 100% duty cycle. The mobile communication node is also configured to schedule the mobile handset for transmission in the wireless network only during a T_D-based TTI.

Thus, according to the present invention, resources are allocated to the UE (or mobile handset) only when the UE is "awake" (i.e., transmitting power) for uplink and downlink transmissions in a duty cycle-limited frequency band. This allows the UE to send/receive ACK/NAK responses when it is awake. Such intelligent scheduling by the network node (e.g., the eNB) may substantially reduce re-transmissions in the wireless system and, hence, may improve system's efficiency in duty cycle-limited frequency bands.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that although the invention is described primarily in the context of a cellular telephone/data network, the invention can be implemented in other forms of wireless networks as well (for example, a corporate-wide wireless data network, a satellite communication network, and the like).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form.

It is noted at the outset that the terms "coupled," "connected", "connecting," "electrically connected," etc., are used interchangeably herein to generally refer to the condition of being electrically connected. Similarly, a first entity is considered to be in "communication" with a second entity (or entities) when the first entity electrically sends and/or receives (whether through wireline or wireless means) information signals (whether containing voice information or non-voice data information) to the second entity regardless of the type (analog or digital) of those signals. It is further noted that various figures (including component diagrams) shown and discussed herein are for illustrative purpose only, and are not drawn to scale.

Figure 3:
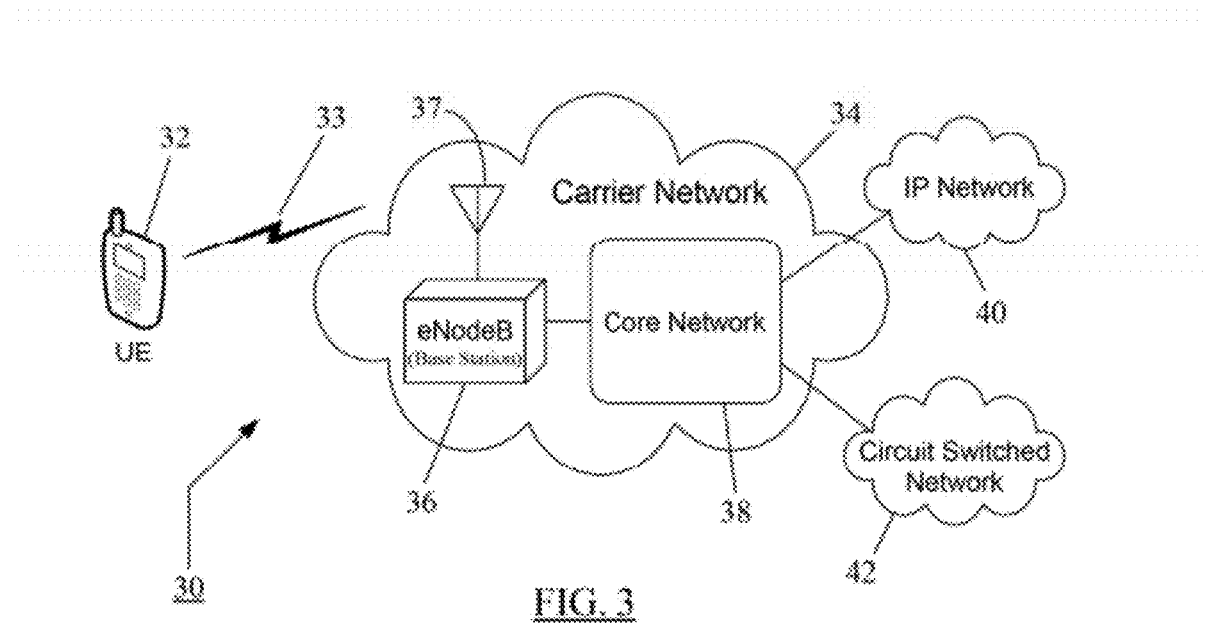
FIG. 3 is a diagram of an exemplary FDD (Frequency Division Duplex) wireless system in which intelligent scheduling according to the teachings of one embodiment of the present invention may be implemented.

FIG. 3 is a diagram of an exemplary FDD (Frequency Division Duplex) wireless system 30 in which intelligent scheduling according to the teachings of one embodiment of the present invention may be implemented. The system 30 may include a mobile handset 32 that is in wireless communication with a carrier network 34 of a wireless service provider through a communication node (or network node) 36 of the carrier network 34. The communication node 36 may be, for example, a base station in a 3G network or an evolved Node-B (eNodeB) when the carrier network is a Third Generation Partnership Project (3GPP) Long-Term Evolution (LTE) network, and may provide radio interface to the mobile handset 32. In other embodiments, the communication node 36 may also include a site controller, an access point (AP), a network node, or any other type of radio interface device capable of operating in a wireless environment. It is noted here that the terms such as "mobile handset," "mobile device," "wireless handset," and "user equipment (UE)" may be used interchangeably herein to refer to a wireless communication device that is capable of voice and/or data communication via a wireless carrier network. Some examples of such mobile handsets include cellular telephones or data transfer equipments (e.g., a PDA (Personal Digital Assistant), a pager), smartphones (e.g., iPhone™, Android™, Blackberry™, etc.), mobile computers, or any other type of user devices capable of operating in a wireless environment. Similarly, the terms "wireless network" or "carrier network" may be used interchangeably herein to refer to a wireless communication network (e.g., a cellular network) facilitating voice and/or data communication between two user equipments (UE's).

In addition to providing air interface (e.g., as represented by a wireless link 33 in FIG. 3) to the UE 32 via an antenna 37, the communication node 36 may also perform radio resource management and scheduling (as, for example, in case of an eNodeB in an LTE system) according to the flow chart illustrated in FIG. 4 and discussed later below. In case of a 3G carrier network 34, the communication node 36 may include functionalities of a 3G base station along with some or all functionalities of a 3G Radio Network Controller (RNC) to performs the tasks identified in FIG. 4. Communication nodes in other types of carrier networks also may be configured similarly. In one embodiment, the node 36 may be configured (in hardware, via software, or both) to carry out the functionalities referred to in the flow chart in FIG. 4. For example, when existing hardware architecture of the communication node 36 cannot be modified, the process steps in FIG. 4 to provide intelligent scheduling for substantially retransmission-less wireless communication according to one embodiment of the present invention may be implemented through suitable-programming of one or more processors (e.g., processor 60 in FIG. 7) in the communication node 36. The execution of the program code (by a processor in the node 36) may cause the processor to perform a function or process step in FIG. 4 to implement the desired task. Thus, in the discussion below, although the communication node 36 may be referred to as "performing," "accomplishing," or "carrying out" a function or process, it is evident to one skilled in the art that such performance may be technically accomplished in hardware and/or software as desired.

The carrier network 34 may include a core network 38 coupled to the communication node 36 and providing logical and control functions (e.g., subscriber account management, billing, subscriber mobility management, etc.) in the network 38. In case of an LTE carrier network, the core network 38 may be an AGW (Access Gateway). Regardless of the type of carrier network 34, the core network 38 may function to provide connection of the UE 32 to other mobile handsets operating in the carrier network 34 and also to other communication devices (e.g., wireline phones) or resources (e.g., an Internet website) in other voice and/or data networks external to the carrier network 34. In that regard, the core network 38 may be coupled to a packet-switched network 40 (e.g., an IP (Internet Protocol) network such as the Internet) as well as a circuit-switched network 42 (e.g., the Public-Switched Telephone Network or PSTN) to accomplish the desired connections beyond the devices operating in the carrier network 34. Thus, through the communication node's 36 connection to the core network 38 and the handset's 32 radio link with the communication node 36, a user of the handset 32 may wirelessly (and seamlessly) access many different resources or systems beyond those operating within the carrier network 34 of an operator.

As is understood, the carrier network 34 may be a cellular telephone network in which the UE 32 may be a subscriber unit. However, as mentioned before, the present invention is operable in other non-cellular wireless networks as well (whether voice networks, data networks, or both). Furthermore, portions of the carrier network 34 may include, independently or in combination, any of the present or future wireline or wireless communication networks such as, for example, the PSTN, or a satellite-based communication link. Similarly, as also mentioned above, the carrier network 34 may be connected to the Internet via its core network's 38 connection to the IP (packet-switched) network 40 or may include a portion of the Internet as part thereof.

Figure 1:
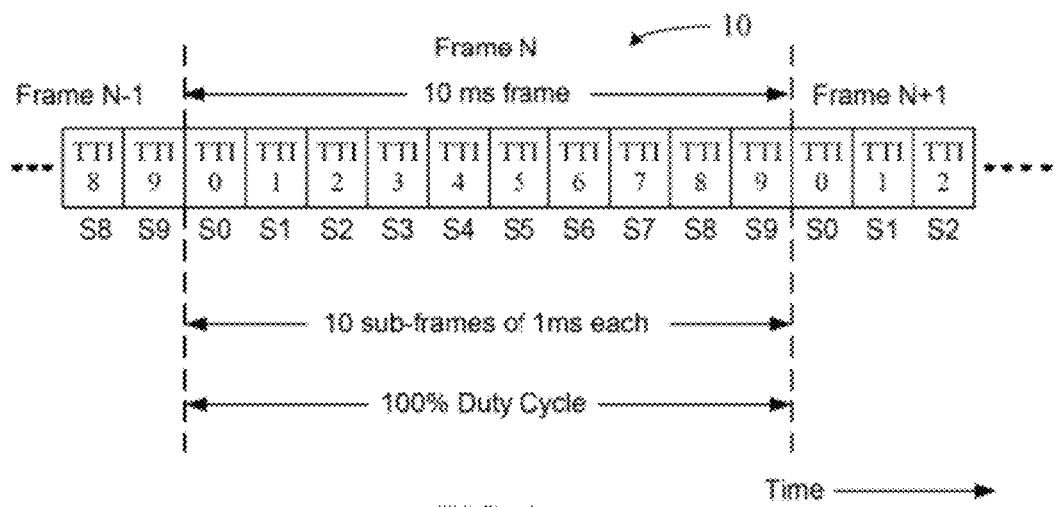
FIG. 1 identifies an exemplary radio frame having a 100% duty cycle.
Figure 4:
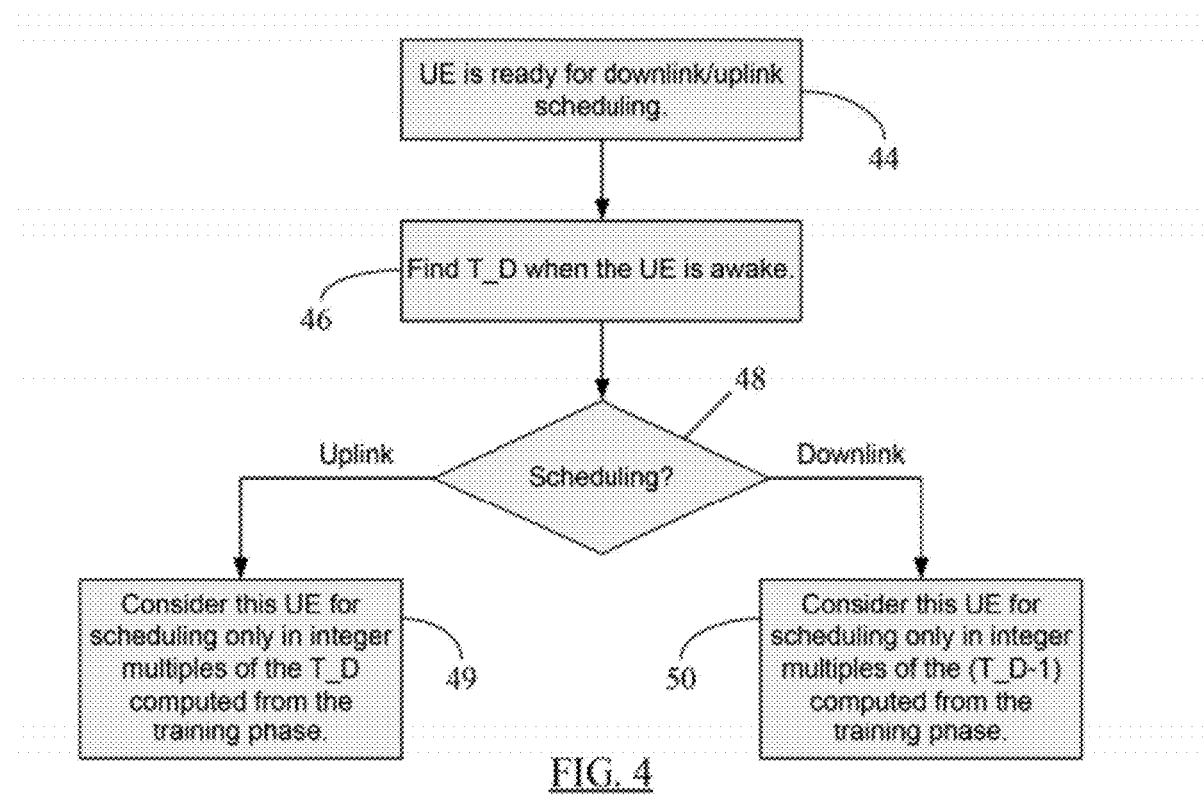
FIG. 4 is an exemplary flow chart of operations that may be carried out in the carrier network in FIG. 1 according to one embodiment of the present invention to provide intelligent scheduling in duty cycle-limited frequency bands.

FIG. 4 is an exemplary flow chart of operations that may be carried out in the carrier network in FIG. 1 according to one embodiment of the present invention to provide intelligent scheduling in duty cycle-limited frequency bands. In the discussion below, the flow chart in FIG. 4 will be explained in conjunction with physical channel signaling illustrated in FIGS. 5-6. Furthermore, as mentioned before, although the teachings of the present invention are applicable to various mobile communication methods, the discussion below is given particularly with reference to 3GPP's LTE technologies. As is appreciated, the LTE-related implementation details discussed below may be suitably modified or adapted to implement the teachings of the present invention in the context of other FDD wireless technologies such as, for example, the WiFi (IEEE 802.11) and the WiMAX (IEEE 802.16) networking technologies, Digital Audio/Video Broadcast (DAB/DVB) systems, Third Generation (3G) and Fourth Generation (4G) mobile systems, the EVDO (Evolution Data Optimized) based wireless data transmission technologies, etc.

Figure 2:
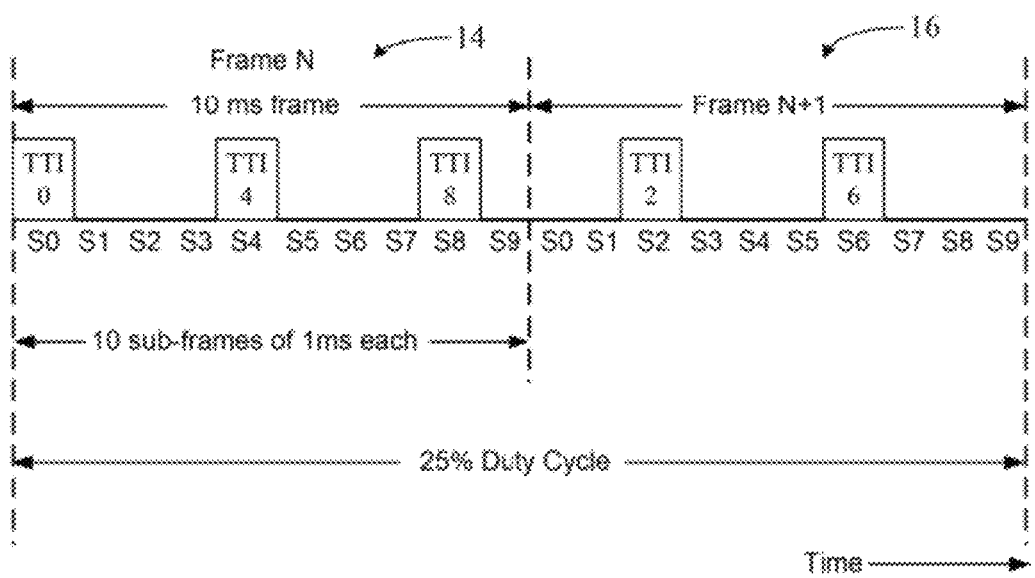
FIG. 2 identifies two exemplary radio frames implementing a 25% duty cycle power transmission from a mobile device.

Generally, when the UE 32 first tries an initial access to a prescribed cell (not shown) in the carrier network 34 or when the UE 32 is first powered on in the network 34, the UE 32 may need to acquire system information of the corresponding cell from the eNB 36. The UE 32 can receive such basic information as, for example, system bandwidth, via the Physical Broadcast Channel (PBCH) transmitted by the eNB 36. Then, to acquire detailed system information of the corresponding cell, the UE 32 receives a Physical Downlink Control Channel (PDCCH) from eNB 36 in a specific subframe of a radio frame (some exemplary radio frames and their subframes are illustrated in FIGS. 1-2), thereby allowing the UE 32 to receive detailed system information (e.g., scheduling information such as time/frequency resources assigned to the UE 32, the transmission format to be used by UE 32, etc.) via the PDSCH (Physical Downlink Shared Channel) transmitted by eNB 36 through that subframe. A scheduler (e.g., the scheduler 67 in FIG. 7) in the eNB 36 may provide the scheduling decision for UE 32 based on a number of factors such as, for example, QoS (Quality of Service) parameters, UE buffer status, uplink channel quality report received from UE 32, UE capabilities, etc.

The scheduling discussion in the preceding paragraph may easily apply when the UE 32 is operating under a 100% duty cycle. However, if the UE 32 is operating in a duty cycle-limited frequency band (e.g., the WCS band discussed hereinbefore), then the UE's 32 duty cycle may not be known to eNB 36 in advance and the eNB 36 may need to first determine the TTI's in which the UE 32 is "awake" (i.e., transmitting power) so as to provide intelligent scheduling of available time/frequency resources without frequent back and forth re-transmissions between the UE 32 and the eNB 36. Based on periodic synchronization and "hand-shaking" carried out with the UE 32 under the LTE network protocol, the eNB 36 may initially sense (e.g., when the UE 32 is powered on, when the UE 32 requests initial access to a prescribed cell, or when the UE 32 changes its operational frequency band from a 100% duty cycle band to a duty cycle-limited band) whether the UE 32 is operating in a duty cycle-limited band. Thus, when the UE 32 is ready for downlink/uplink scheduling in a duty cycle-limited frequency band (as indicated at block 44 in FIG. 2), the eNB 36 may first determine a duty cycle-related TTI pattern (referred to herein as "T_D") of the UE 32 (block 46, FIG. 4) based on certain uplink or downlink measurements (discussed later hereinbelow) when the UE 32 is awake under its operating duty cycle of P % (wherein P<100). The eNB 36 may then schedule UE 32 for uplink/downlink transmissions in the wireless network 34 only during a T_D-based TTI as indicated at blocks 48-50 in FIG. 4 (and discussed in more detail hereinbelow) so as to enable eNB 36 to establish a substantially retransmission-less communication with UE 32 in the duty cycle-limited wireless frequency band.

It is observed here that the parameter T_D denotes the duty cycle-related TTI pattern when the UE 32 is "awake." The determination of T_D at block 46 in FIG. 4 may be referred to as a "training stage," whereas the scheduling identified at blocks 48-50 in FIG. 4 may be referred to as a "scheduling stage" according to the teachings of one embodiment of the present invention. The training stage may be performed by a training module (e.g., the training module 65 in FIG. 7) in the eNB 36 and the scheduling stage may be performed by a scheduler (e.g., the scheduler 67 in FIG. 7) in the eNB 36.

Figure 5:
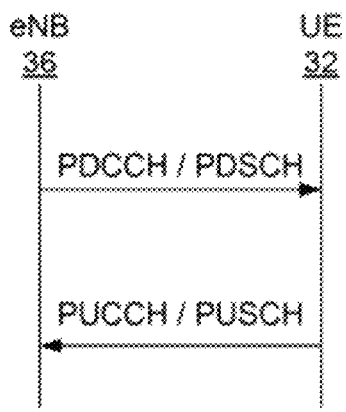
FIG. 5 illustrates an exemplary downlink and uplink messaging sequence between a communication node and a mobile handset that may be used to determine T_D according to the embodiment in FIG. 4.
Figure 6:
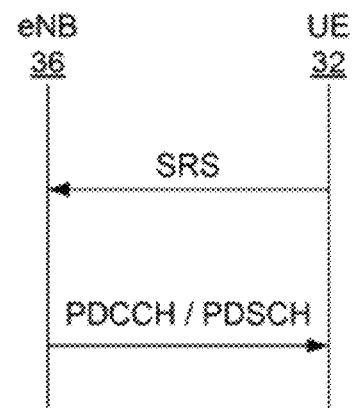
FIG. 6 shows an exemplary SRS (Sounding Reference Signal) messaging sequence between the eNodeB and the UE (User Equipment or mobile handset) that may be optionally used to determine T_D according to the embodiment in FIG. 4.

In one embodiment, T_D may be determined as per block 46 in FIG. 4 based on certain uplink and/or downlink measurements. A wireless communication system with adaptive modulation and coding (such as, for example, an LTE system) may require frequent channel quality reports from UE. For example, in 3GPP LTE, such uplink channel quality reports are referred to as CQI (Channel Quality Information) reports and are sent on PUCCH/PUSCH (Physical Uplink Control Channel/Physical Uplink Shared Channel) resources in a radio frame. The CQI uplink reports may be sent by the UE 32 in response to the downlink PDCCH/PDSCH signaling received from the eNB 36. FIG. 5 illustrates an exemplary downlink and uplink messaging sequence between a communication node (e.g., the eNB 36) and a mobile handset (e.g., the UE 32) that may be used to determine T_D according to the embodiment in FIG. 4. Another uplink parameter report that may be sent by the UE 32 includes a UE pilot signal or an SRS (Sounding Reference Signal) report. The SRS signal may be used by the UE 32 to allow the eNB 36 to provide channel-dependent (i.e., frequency selective) uplink scheduling. In response to the SRS signal from the UE 32, the eNB 36 may provide the requested scheduling information via PDCCH/PDSCH as indicated in FIG. 6, which shows an exemplary SRS messaging sequence between the eNB 36 and the UE 32 that may be optionally used to determine T_D according to the embodiment in FIG. 4. Thus, T_D may be determined based on uplink measurements (e.g., form UE's CQI reports and/or SRS reports) and/or downlink measurements on PDCCH/PDSCH as discussed in more detail below.

In case of uplink measurements to determine T_D (block 46, FIG. 4), it is observed that the CQI reporting interval and the SRS reporting interval are configurable. The eNB 36 can configure any of these parameter reporting intervals via, for example, PDCCH/PDSCH signaling. For the sake of brevity, the discussion below focuses on a T_D determination methodology based on CQI reporting by UE. But, it is noted here that the CQI report-based T_D determination methodology discussed below equally applies in case SRS reports are used instead of CQI reports. Hence, additional discussion of T_D determination from SRS reports (or configuration of SRS reporting interval by eNB) is not provided herein.

In one embodiment, the eNB 36 may configure the CQI reporting interval to be equal to 1 (one) TTI of a known duty cycle and may require the UE 32 to provide CQI reporting on each TTI it is "awake". Thus, for example, when the known duty cycle is the 100% duty cycle illustrated in FIG. 1 (or if the UE 32 were operating at 100% duty cycle), the CQI reporting interval may be configured to be equal to 1 ms (i.e., duration of one TTI in a radio frame having 100% duty cycle). Thereafter, the eNB 36 may receive a pre-determined number of CQI reports from the UE 32. In one embodiment, this pre-determined number may be equal to the total number of TTI's in the known duty cycle. Thus, when the known duty cycle is the 100% duty cycle shown in FIG. 1, the eNB 36 may continue to receive CQI reports from the UE 32 until ten (10) such reports are received (because there are 10 TTI's in a radio frame having 100% duty cycle as shown in FIG. 1). The time duration it takes for the eNB 36 to receive this pre-determined number of CQI reports from the UE 32 may be referred to herein as "T_Observe." The eNB 36 can then determine the UE's 32 partial duty cycle of P % (wherein P<100) by calculating a ratio of the time duration of a single radio frame of the known duty cycle (which represents the time duration of the total number of TTI's in the known duty cycle) and T_Observe. Thus, P %=(Time duration of known duty cycle/T_Observe)×100. For example, when the known duty cycle is the 100% duty cycle of FIG. 1, the numerator of this ratio (representing the time duration of the known duty cycle) would be 10 ms as can be seen from FIG. 1. If the denominator T_Observe=40 ms, then P %=(10/40)×100=25%. In this case, the UE 32 may be considered to be operating under the partial duty cycle of 25%. The value of T_D (i.e., the duty cycle-related TTI pattern of the UE 32 when the UE 32 is "awake" and operating under a partial duty cycle of P % (P<100)) may be ascertained from the determination of the partial duty cycle as discussed herein and from the "observation" of the CQI reports from the UE 32 obtained during this training stage (block 46 in FIG. 4). For example, when P % is determined to be 25%, the eNB 36 may be configured to "observe" UE's CQI reports to determine the TTI's which constitute the 25% duty cycle and in which the UE is transmitting. Thus, in case of P %=25%, the parameter T_D may be determined to be "5 TTI's in 2 radio frames" or "5 TTI's in 20 ms" (as can be seen from FIG. 2). The eNB 36 may also "know" the TTI's (e.g., the TTI's shown in FIG. 2) in which the UE 32 remains "awake" during the partial duty cycle.

As mentioned before, similar determination of T_D at block 46 in FIG. 4 may be made using SRS reports instead of (or in addition to) CQI reports. Thus, T_D may be determined by modifying UE's SRS reporting interval and SRS reporting behavior in the same manner as that discussed above in conjunction with CQI reporting. In view of the foregoing discussion related to determination of T_D from uplink CQI reporting, no further discussion of determination of T_D based on SRS reporting is provided herein.

In case of downlink measurements to determine T_D (block 46, FIG. 4), the eNB 36 may be configured to use PDCCH/PDSCH signaling to get a sense of the TTI's in which the UE 32 is transmitting. For example, in one embodiment, the eNB 36 may use the PDCCH signaling to communicate to the UE 32 on which TTI's UE 32 can transmit information (e.g., voice/data traffic, system-related information, etc.). To determine T_D for the UE 32 operating under a partial duty cycle of P % (P<100), the eNB 36 may use downlink signaling (e.g., PDCCH/PDSCH) to allocate network resources to the UE 32 continuously for a pre-determined number of TTI's of a known duty cycle (i.e., for a pre-determined time period). For example, if the known duty cycle is the 100% duty cycle illustrated in FIG. 1, then the eNB 36 may allocate network resources continuously for 100 consecutive TTI's—i.e., for ten (10) radio frames each similar to the radio Frame N in FIG. 1. In other words, the eNB 36 may effectively "force" the UE 32 to transmit 100 times over a time period of 100 ms—i.e., in each TTI (i.e., TTI-0 through TTI-9 shown in FIG. 1) of each of the ten radio frames, each radio frame having 100% duty cycle as shown in FIG. 1. If UE 32 were operating under 100% duty cycle as in FIG. 1, then UE 32 may be easily able to comply with this requirement because it would be transmitting power in each TTI anyway. However, when the UE 32 is operating at the P % (P<100) duty cycle, the UE 32 may not be able to transmit in each of the mandated TTI. Rather, in case of this P % duty cycle, the UE 32 may transmit only in those TTI's in which it is "awake." The eNB 36 may determine the partial duty cycle (P %) of the UE 32 from the total number of transmissions received from the UE 32 during this pre-determined number of TTI's (here, 100 TTI's). For example, if there are 25 transmissions received from the UE 32 over a time period equal to 100 consecutive TTI's, then the partial duty cycle of the UE 32 would be P %=(25/100)×100=25%. As in case of uplink measurements, the value of T_D (i.e., the duty cycle-related TTI pattern of the UE 32 when the UE 32 is "awake" and operating under a partial duty cycle of P % (P<100)) may be similarly ascertained by the eNB 36 from the determination of the partial duty cycle and from the "observation" of the TTI transmission pattern from the UE 32 obtained during this training stage (block 46 in FIG. 4) using downlink signaling. For example, when P % is determined to be 25%, the eNB 36 may be configured to "observe" UE's TTI transmissions to determine the TTI's which constitute the 25% duty cycle and in which the UE is transmitting. Thus, in case of P %=25%, the parameter T_D may be determined to be "5 TTI's in 2 radio frames" or "5 TTI's in 20 ms" (as can be seen from FIG. 2). The eNB 36 may also "know" the TTI's (e.g., TTI-0, TTI-4, TTI-8, etc., as shown in FIG. 2) in which the UE 32 remains "awake" during the partial duty cycle.

In one embodiment, the eNB 36 may perform the training (at block 46 in FIG. 4) for a few TTI's (as discussed before) when the UE 32 is powered on (or when the UE 32 requests initial access to a prescribed cell, or when the UE 32 changes its operational frequency band from a 100% duty cycle band to a duty cycle-limited band, as the case may be). The results of the training stage (i.e., determination of UE's 32 partial duty cycle and that duty cycle-related TTI pattern (or T_D)) may be stored in a memory (e.g., the memory 66 in FIG. 7) in the eNB 36, and thereafter the training module (e.g., the trainer module 65 in FIG. 7) may not be invoked again (e.g., so long as UE's operating environment or the conditions necessitating determination of T_D do not change).

Once UE's partial duty cycle related TTI pattern (T_D) is determined (block 46, FIG. 4), the eNB 36 may perform intelligent scheduling as indicated at blocks 48-50 in FIG. 4. As part of the intelligent scheduling, the eNB 36 may assign network resources (e.g., time/frequency of transmission of voice/data or other information) based on the results of the training stage at block 46 (FIG. 4). The scheduling may be Round Robin, Proportional Fair (PF), QoS (Quality of Service) related, or any other type of scheduling. In one embodiment, the eNB 36 may allocate resources to the UE 32 only during a T_D-based TTI so as to enable eNB 36 to establish a substantially retransmission-less communication with the UE 32 in the duty cycle-limited wireless frequency band. For example, for uplink transmissions, the eNB 36 may allocate resources only for those TTI's that are integer multiples of T_D (block 49, FIG. 4). Thus, in case of the 25% duty cycle case in FIG. 2, the eNB 36 may schedule UE 32 for uplink transmissions only in integer multiples of five (5) TTI's (which constitute its 25% duty cycle)—i.e., the UE 32 may be scheduled to transmit only for five TTI's every two radio frames to allow UE 32 to maintain its 25% duty cycle in compliance with the requirements of the duty cycle-limited wireless frequency band. Because the eNB 36 "knows" the TTI pattern of the UE 32 (from the measurements during the training stage at block 46 in FIG. 4), the eNB 36 may schedule the UE 32 for uplink transmissions in integer multiples of those TTI's in which the UE 32 is "awake." In case of downlink transmissions, as indicated at block 50 in FIG. 4, the eNB 36 may allocate resources only for those TTI's that are integer multiples of (T_D minus 1) so as to allow the UE 32 to send the ACK/NAK response when it is awake. Thus, in case of the 25% duty cycle case in FIG. 2, the eNB 36 may schedule UE 32 to receive downlink transmissions only in integer multiples of four (4) TTI's (T_D−1)—i.e., the UE 32 may be scheduled to receive downlink transmissions only for four TTI's every two radio frames to allow UE 32 to timely send ACK/NAK response (in the fifth remaining TTI of its 25% duty cycle radio frame) when it is awake, thereby maintaining its 25% duty cycle in compliance with the requirements of the duty cycle-limited wireless frequency band. Again, because the eNB 36 "knows" the TTI pattern of the UE 32 (from the measurements during the training stage at block 46 in FIG. 4), the eNB 36 may schedule the UE 32 for downlink transmissions in those TTI's in which the UE 32 is "awake." Such intelligent scheduling may substantially reduce re-transmissions or failed ACK/NAK responses.

Figure 7:
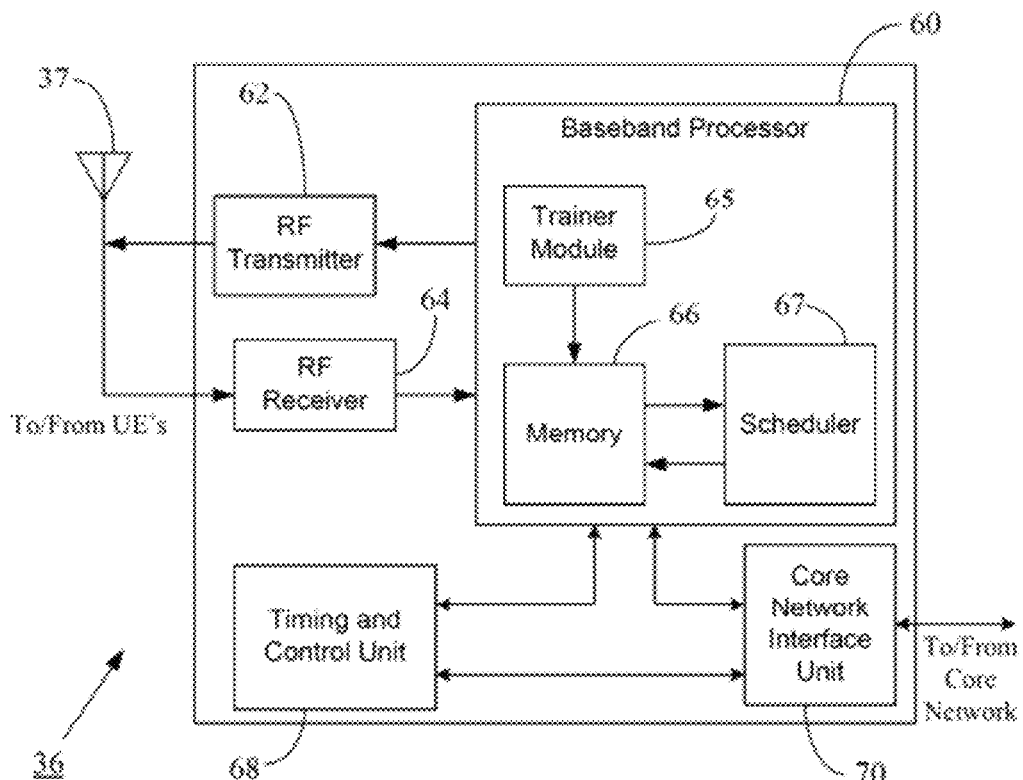
FIG. 7 is a block diagram of an exemplary eNodeB according to one embodiment of the present invention.

FIG. 7 is a block diagram of an exemplary eNodeB (or a similar communication node) 36 according to one embodiment of the present invention. The eNodeB 36 may include a baseband processor 60 to provide radio interface with the mobile handsets (in the carrier network 34) via eNodeB's RF (Radio Frequency) transmitter 62 and RF receiver 64 units coupled to the eNodeB antenna 37. The processor 60 may be configured (in hardware and/or software) to perform all the functions depicted in the exemplary embodiment of FIG. 4. In the context of FIGS. 4-6, the receiver 64 may receive uplink transmissions from the mobile handsets (e.g., UE 32) or responses of mobile handsets to downlink transmissions from eNB 36 (via transmitter 62) in the network 34 and submit the received information to a trainer module 65 in the processor 60 to enable the module 65 to evaluate T_D (i.e., partial duty cycle-related TTI pattern of the UE 32 when the UE 32 is "awake") in the manner discussed hereinbefore with reference to discussion of block 46 in FIG. 4. The trainer module 65 may store the result of this training stage—i.e., the value of T_D—in a memory 66. Thereafter, the trainer module 65 may not be further invoked. However, the memory 66 may inform the scheduler 67 of the presence of T_D therein and the scheduler 67 may then access the memory 66 to obtain the value of T_D to provide intelligent scheduling for the duty cycle-limited UE in the manner discussed hereinbefore with reference to discussion of blocks 48-50 in FIG. 4. The scheduler 67 may have the same data structure as a typical scheduler in an eNB in an LTE system. Furthermore, in one embodiment, prior to scheduling the UE 32 as per the teachings of the present invention, the scheduler 67 may perform a conditional operation (to which the UE 32 can send the ACK/NAK back for that particular TTI) to establish initial contact with the UE 32 prior to sending detailed scheduling information to the UE 32.

It is observed here that the intelligent scheduling according to the teachings of the present invention may be accomplished with network's existing radio resources and signaling framework. Furthermore, the implementation of modules 65-67 in the eNB 36 also may be accomplished without significant disruption to network architecture or functionality.

The processor 60 may also provide additional baseband signal processing (e.g., mobile device registration, channel signal information transmission, radio resource management, etc.) as required. The processor 60 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

The eNodeB 36 may further include a timing and control unit 68 and a core network interface unit 70 as illustrated in FIG. 7. The control unit 68 may monitor operations of the processor 60 and the network interface unit 70, and may provide appropriate timing and control signals to these units. The interface unit 70 may provide a bi-directional interface for the eNodeB 36 to communicate with the core network 38 (FIG. 3) to facilitate administrative and call-management functions for mobile subscribers operating in the carrier network 34 through eNodeB 36.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium (not shown) for execution by a general purpose computer or a processor (e.g., the processor 60 in FIG. 7). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a system and method to provide intelligent scheduling of network resources when a mobile device or user equipment (UE) is operating in a Frequency Division Duplex (FDD) wireless network with duty cycle limitation. Intelligent scheduling is accomplished in two stages—a training stage, and a scheduling stage. In the training stage, a training module in a communication node (e.g., an eNodeB) senses the Transmission Time Interval (TTI) pattern when the UE is "awake" (i.e., when the UE is transmitting power under a P % duty cycle (P<100)). In the scheduling stage, a scheduler in the eNodeB intelligently allocates the network resources to the UE for transmission on both uplink and downlink based on the information from the training stage. Thus, resources are allocated only when the UE is "awake" or can send/receive ACK/NAK when it is awake. Such intelligent scheduling may substantially reduce re-transmissions in the system and, hence, may improve system's efficiency in duty cycle-limited frequency bands. Furthermore, the intelligent scheduling is accomplished with network's existing radio resources and signaling framework, and without significant disruption to network architecture or functionality.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of scheduling communication for a mobile handset operating in a wireless frequency band with a duty cycle limitation, the method comprising the steps of:
    determining a duty cycle-related transmission time interval (TTI) pattern (T_D) of the mobile handset using a network-based processor in wireless communication with the mobile handset via a wireless network associated with the mobile handset, wherein the T_D is determined when the mobile handset is operating in the wireless frequency band with a partial duty cycle that is less than a 100% duty cycle; and
    using the network-based processor, scheduling the mobile handset in the wireless network only during a T_D-based TTI so as to enable the network-based processor to establish a substantially retransmission-less communication with the mobile handset in the wireless frequency band despite the duty cycle limitation.

2. The method of claim 1, wherein the T_D is determined when the mobile handset is powered on.

3. The method of claim 1, wherein determining the T_D includes:
    using the network-based processor, mandating a pre-determined transmission pattern for the mobile handset; and
    determining the T_D from at least one response received from the mobile handset while complying with the pre-determined transmission pattern.

4. The method of claim 1, wherein the partial duty cycle is unknown when the mobile handset initially communicates with the network-based processor after being powered on.

5. The method of claim 4, wherein determining the T_D includes:
    using the network-based processor, determining the partial duty cycle; and
    ascertaining the T_D from determination of the partial duty cycle using the network-based processor.

6. The method of claim 1, wherein determining the T_D includes:
    using the network-based processor, configuring an uplink parameter reporting interval for the mobile handset to be equal to a known TTI, wherein the known TTI is equal to a transmission time interval of a known duty cycle and wherein a first pre-determined number of the known TTI's constitutes the known duty cycle;
    using the network-based processor, receiving a second pre-determined number of uplink parameter reports from the mobile handset, wherein the second pre-determined number is equal to the first pre-determined number;
    using the network-based processor, determining the partial duty cycle of the mobile handset by calculating a ratio of a first time period equal to the time duration of the known duty cycle and a second time period equal to the time duration required to receive the second pre-determined number of the uplink parameter reports; and
    ascertaining the T_D from determination of the partial duty cycle using the network-based processor.

7. The method of claim 6, wherein the known duty cycle is the 100% duty cycle.

8. The method of claim 6, wherein the uplink parameter reports are one of the following:
    CQI (Channel Quality Information) reports when the uplink parameter reporting interval is a CQI reporting interval; and
    SRS (Sounding Reference Signal) reports when the uplink parameter reporting interval is an SRS reporting interval.

9. The method of claim 1, wherein determining the T_D includes:
    using downlink signaling from the network-based processor, allocating network resources to the mobile handset continuously for a pre-determined number of known TTI's, wherein each known TTI is equal to a transmission time interval of a known duty cycle;
    using the network-based processor, receiving transmissions from the mobile handset during the pre-determined number of known TTI's;
    using the network-based processor, determining the partial duty cycle of the mobile handset from the total number of the transmissions received from the mobile handset during the pre-determined number of known TTI's; and
    ascertaining the T_D from determination of the partial duty cycle using the network-based processor.

10. The method of claim 9, wherein the know duty cycle is the 100% duty cycle.

11. The method of claim 1, wherein scheduling the mobile handset includes at least one of the following:
    allocating uplink network resources to the mobile handset only during integer multiples of said T_D; and
    allocating downlink network resources to the mobile handset only during integer multiples of T_D−1.

12. A mobile communication node configured to provide radio interface to a mobile handset in a wireless network associated with the mobile handset, wherein the mobile communication node comprises:
    means for determining a duty cycle-related transmission time interval (TTI) pattern (T_D) of the mobile handset when the mobile handset is operating under a duty-cycle limited wireless frequency band in the wireless network with a partial duty cycle that is less than a 100% duty cycle; and
    means for scheduling the mobile handset for transmission in the wireless network only during a T_D-based TTI.

13. The mobile communication node of claim 12, wherein the means for determining includes:
    means for determining the partial duty cycle when the mobile handset is powered on; and
    means for ascertaining the T_D from determination of the partial duty cycle.

14. The mobile communication node of claim 12, wherein the means for determining includes:
    means for configuring an uplink parameter reporting interval for the mobile handset to be equal to a known TTI, wherein the known TTI is equal to a transmission time interval of the mobile handset operating at the 100% duty cycle and wherein a first pre-determined number of the known TTI's constitutes the 100% duty cycle;
    means for receiving a second pre-determined number of uplink parameter reports from the mobile handset, wherein the second pre-determined number is equal to the first pre-determined number;
    means for determining the partial duty cycle of the mobile handset by calculating a ratio of a first time period equal to the time duration of the 100% duty cycle and a second time period equal to the time duration required to receive the second pre-determined number of the uplink parameter reports; and means for ascertaining the T_D from determination of the partial duty cycle.

15. The mobile communication node of claim 12, wherein the means for determining includes:

means for using downlink signaling to allocate network resources to the mobile handset continuously for a pre-determined number of known TTI's, wherein each known TTI is equal to a transmission time interval of the mobile handset operating at the 100% duty cycle;

means for receiving transmissions from the mobile handset during the pre-determined number of known TTI's;

means for determining the partial duty cycle of the mobile handset from the total number of the transmissions received from the mobile handset during the pre-determined number of known TTI's; and means for ascertaining the T_D from determination of the partial duty cycle.

16. A method comprising:

at a network-based processor that is in wireless communication with the mobile handset via a wireless network associated with the mobile handset, determining a partial duty cycle of the mobile handset; and using the network-based processor, scheduling the mobile handset to transmit to the network-based processor in the wireless network only during the partial duty cycle of the mobile handset, wherein the mobile handset operates only at the partial duty cycle when communicating under a duty cycle-limited wireless frequency band in the wireless network, wherein the partial duty cycle is less than a 100% duty cycle, wherein the partial duty cycle of the mobile handset is determined using one of the following:

a first response of the mobile handset to a downlink signaling requirement from the network-based processor; and a second response of the mobile handset to an uplink signaling requirement from the network-based processor.

17. A system comprising:

a mobile handset operable in a wireless network associated therewith; and a mobile communication node configured to provide radio interface to the mobile handset in the wireless network, wherein the mobile communication node is further configured to perform the following:

determine a duty cycle-related transmission time interval (TTI) pattern (T_D) of the mobile handset when the mobile handset is powered on and operating in the wireless network under a duty-cycle limited wireless frequency band with a partial duty cycle that is less than a 100% duty cycle, and schedule the mobile handset for transmission in the wireless network only during a T_D-based TTI.

18. The system of claim 17, wherein the mobile communication node is further configured to perform the following as part of determination of the T_D:

mandate a pre-determined transmission pattern for the mobile handset; and determine the T_D from at least one response received from the mobile handset while complying with the pre-determined transmission pattern.

19. The system of claim 17, wherein the partial duty cycle is unknown when the mobile handset initially communicates with the network-based processor after being powered on, and wherein the mobile communication node is further configured to perform the following as part of determination of the T_D:

determine the partial duty cycle; and ascertain the T_D from determination of the partial duty cycle.

* * * * *